United States Patent [19]
Iino et al.

[11] Patent Number: 5,343,464
[45] Date of Patent: Aug. 30, 1994

[54] SWITCHING SYSTEM BETWEEN WORKING TRANSMISSION LINES AND PROTECTION TRANSMISSION LINE

[75] Inventors: Hatsumi Iino; Takeo Fukushima, both of Kawasaki, Japan

[73] Assignee: Fujitsu Limited, Kawasaki, Japan

[21] Appl. No.: 851,480

[22] Filed: Mar. 13, 1992

[30] Foreign Application Priority Data

Mar. 14, 1991 [JP] Japan .................. 3-074638

[51] Int. Cl.$^5$ .............................. H04L 1/22
[52] U.S. Cl. ....................... 370/16; 370/55; 371/8.2; 375/38; 340/825.01
[58] Field of Search ............... 359/115, 117, 135, 136, 359/154; 370/16, 42, 55, 85.6, 95.1; 455/8, 52, 59, 63; 375/38, 40; 340/825.01; 371/8.2, 11.2

[56] References Cited
U.S. PATENT DOCUMENTS

| | | | |
|---|---|---|---|
| 4,984,252 | 1/1991 | Morimoto | 455/8 |
| 5,010,550 | 4/1991 | Hirata | 455/8 |
| 5,014,261 | 5/1991 | Shinbashi et al. | 375/38 |
| 5,105,420 | 4/1992 | Ardon et al. | 370/16 |
| 5,109,296 | 4/1992 | Fukushima et al. | 370/16 |

*Primary Examiner*—Benedict V. Safourek
*Attorney, Agent, or Firm*—Staas & Halsey

[57] ABSTRACT

A switching system includes a protection switch that operates to switch a working transmission line to a protection transmission line or switch an optional transmission line to the protection transmission line. The protection switch consists of a first speed converting unit, a second speed converting unit and an add-drop unit that handles a lower order signal and is sandwiched therebetween. The optional transmission line for carrying a lower order signal is connected, via the add-drop unit and the second converting unit, to the protection transmission line carrying a higher order signal during an add-drop operation. Alternatively, the working transmission line carrying a higher order signal is connected, via the add-drop unit and the first and second converting units, to the protection transmission line under a through operation mode. The protection switch is preferably realized by using an add-drop multiplexer (ADM).

11 Claims, 9 Drawing Sheets

SWITCHING SYSTEM BETWEEN WORKING TRANSMISSION LINES AND PROTECTION TRANSMISSION LINE

BACKGROUND OF THE INVENTION

1. Field of the Invention

The present invention relates to a switching system between the working transmission lines and a protection transmission line, and more particularly, to a switching system for switching, the signals of higher signal level from either one of the working transmission lines to the protection transmission line if a fault occurs on the former transmission line.

A known switching system is set up with the protection transmission line that is commonly used by a plurality of working transmission lines. In the case where maintenance, fault restoration or testing is required with respect to one of the working transmission lines, switching is performed from the working transmission line to the protection transmission line, whereby communication through the working transmission line can be continuously maintained.

2. Description of the Related Art

According to a typical and conventional switching system, as will be explained hereinafter, the protection transmission line is not activated during a normal state, but is activated only when a fault restoration and so on is needed for some working transmission line, i.e., an abnormal state. Further, a dummy signal generator is required to periodically monitor the condition of the protection transmission line, because the protection transmission line is not frequently used. Thus, a communication network that operates on the above switching system does not work with high efficiency, since the protection transmission line is used most of time to transmit the dummy signal, which is irrelevant to the inherent communication of user information.

To overcome the above shortcomings of the above switching system, an improved switching system has been proposed and will be explained hereinafter. According to the improved switching system, an optional transmission line is incorporated in the switching system. During a normal state, protection equipment can transmit user information over its protection transmission line, user information which is given via the optional transmission line. In this case, the user information on the optional transmission line should be low in priority compared to the user information on the inherent working transmission lines. Thus, the aforesaid dummy signal generation can be eliminated and further the protection transmission line can be utilized to realize a higher performance communication network.

However, some problems arise in the above improved switching system. First, means for multiplexing the optional user information signal to the higher signal level is needed, because the protection transmission line, e.g., an optical transmission line, carries multiplexed signals of higher signal levels. Second, a protection switch mounted in the protection equipment must operate at very high speed, e.g., 600 Mbits/s, because the protection switch must switch when switching is required for a working transmission line, and a high speed optional user information signal to the user information signal on the related working transmission line is required which is a multiplexed signal of a high signal level. This means that the protection switch should be fabricated using high speed operating devices at a rate of, e.g., 600 Mbits/s, and thus the protection switch cannot be obtained at a low price because such high speed operating devices cannot be fabricated using commercially available and low cost complementary metal oxide semiconductor (CMOS) devices. Third, particular connectors are needed to join the multiplexing means and the protection equipment, the connectors of which cannot be manufactured without a special order.

SUMMARY OF THE INVENTION

Therefore, the present invention, in view of the above problems, has as its object the provision of a switching system that can be constructed without using the aforesaid multiplexing means, without using the high speed operating devices and can avoid using the special connector.

To attain the above object, the present invention provides a protection switch in the protection equipment, the protection switch of which is comprised of a first converting means for achieving a conversion of signals between a lower order signal and a higher order signal at the working transmission side, a second converting means for achieving a conversion of signals between the lower order signal and the higher order signal and an add-drop means for performing, at the stage of the lower order signal, a through operation and an add-drop operation selectively, during the through operation of which the working transmission line and the protection transmission line are engaged, and during the add-drop operation of which the protection transmission line and the optional transmission line are engaged.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
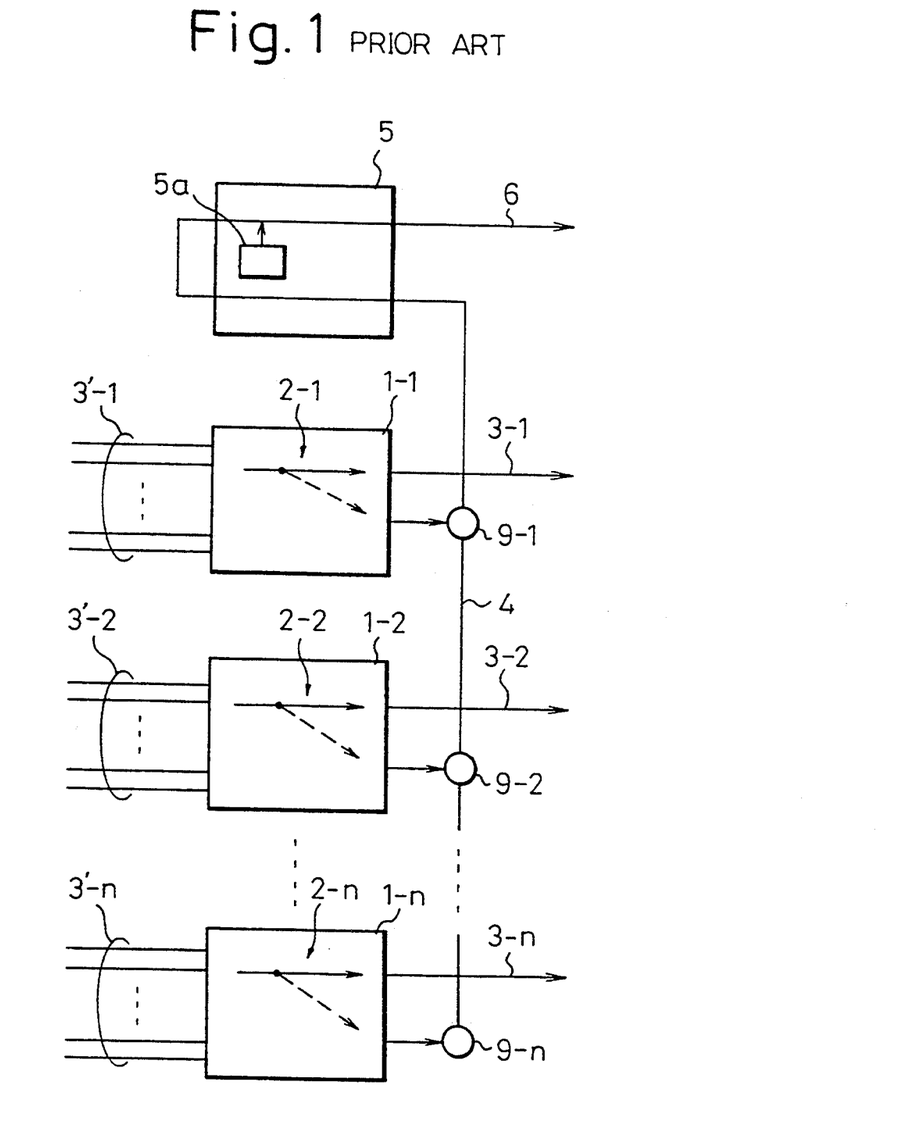
FIG. 1 illustrates the construction of a typical and conventional switching system operated with a plurality of terminal office equipment and protection equipment.

FIG. 1 illustrates a construction of a typical and conventional switching system operated with a plurality of terminal office equipment and protection equipment. In FIG. 4, reference numerals 1—1 through 1—n represent working terminal office equipment each having a working transmission line (3—1 to 3—n) for higher order signals level and a working transmission line (3'—1 to 3'—n) lower order signals. The working terminal office equipment (1—1 to 1—n) includes therein a working switch (2—1 to 2—n). In a normal state, each of the working switches (2—1 to 2—n) assumes a path indicated by a solid line arrow. However, in an abnormal state, that is, when trouble occurs or maintenance or testing is required for a working transmission line, e.g. line 3—1, the corresponding working switch 2—1 assumes a path indicated by a broken line. Thus the working transmission line 3—1 is switched to a protection transmission line 6. In this case, the signal given from the line 3'—1 is transferred, after multiplexing and transducing the same into a photo signal, to the protection line 6 of a higher signal level by way of a photo coupler 9—1 and a by-pass line 4 of a higher order signal and and protection equipment 5.

In a communication network employing the switching system illustrated in FIG. 1, as mentioned before, the protection transmission line 6 is utilized only during an abnormal state. In other words, the protection transmission line 6 is not utilized most of the time. Further, the aforesaid dummy signal generator 5a is required to be installed in the protection equipment 5 for a periodic monitor of the condition of the line 6, the generator 5a of which is irrelevant and not useful for performing an inherent communication of information.

To overcome the above shortcomings, an improved switching system has been proposed, as mentioned before.

Figure 2:
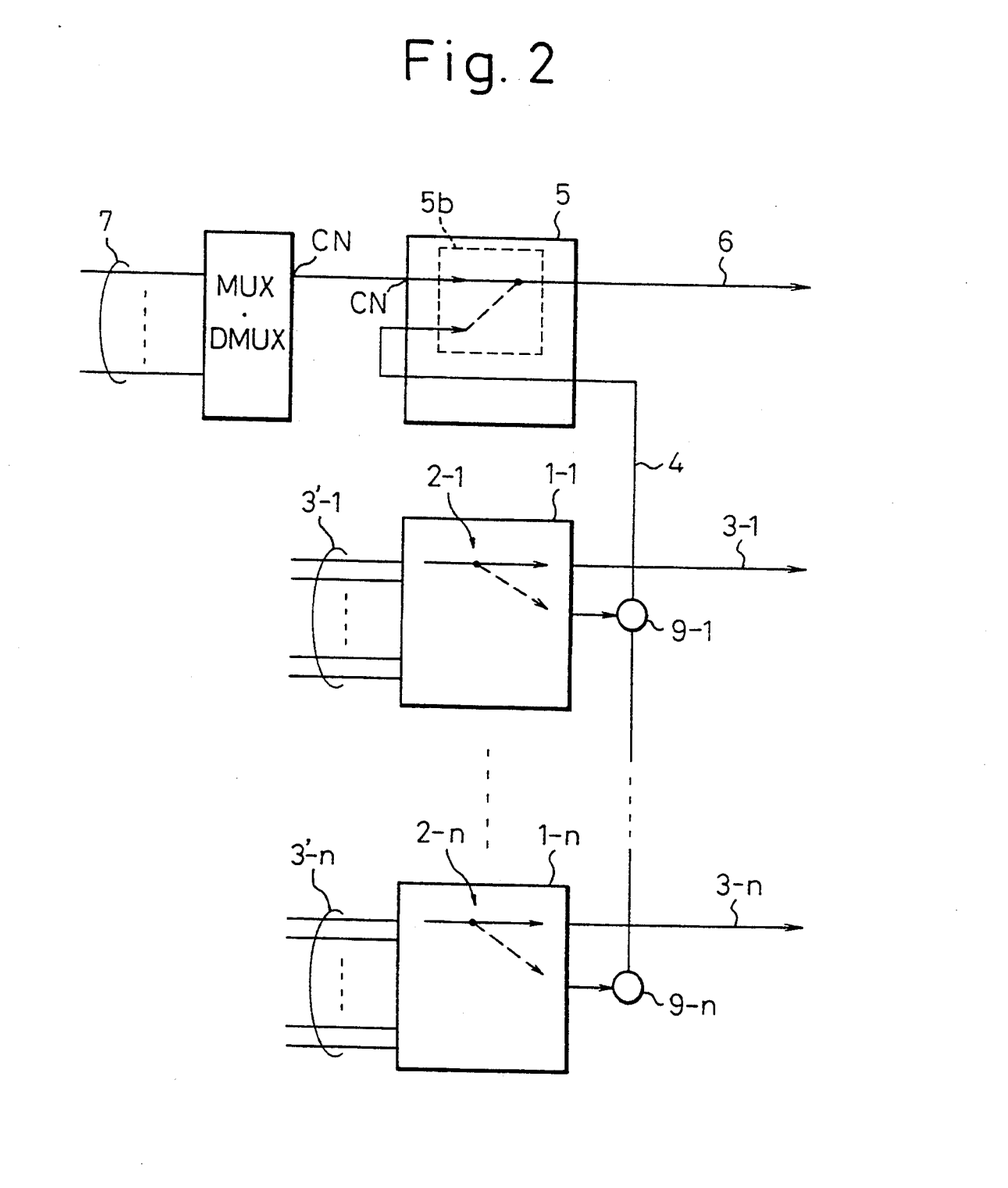
FIG. 2 is a view explaining a switching system improved over the switching system explained in FIG. 1.

FIG. 2 is a view for explaining a switching system improved over the switching system explained by referring to FIG. 1. In FIG. 2, the members identical to those of FIG. 1 are represented by same reference numerals (the same for later figures). As seen in FIG. 2, an optional transmission line 7 for lower order signals is introduced in the communication network. The optional transmission line 7 carries other user information having a lower priority than the priority of the user information transferred over the working transmission lines. For example, the user information on the line 7 may consist of information to be communicated as a television display signal at a world fair.

To accommodate the optional transmission line 7 in the protection equipment 5 that handles the high order signals, the lower order signals on the line 7 must be multiplexed (also demultiplexed) by a multiplexer/-demultiplexer (MUX/DMUX) unit as indicated in FIG. 2.

The thus multiplexed signals of higher transmission rate from the MUX/DMUX unit are transmitted over the protection transmission line 6 through a protection switch 5b in the protection equipment 5. Thus, the switch 5b usually assumes the solid line path. However, if one of the working transmission lines (3—1 to 3—n) is to be switched over to the protection transmission line 6, the switch 5b assumes the broken line path to pass therethrough the higher order signals given from the related working terminal office equipment via the photocoupler (9) and the by-pass line 4.

Thus the switching system of FIG. 2 can overcome the aforesaid shortcomings produced by the switching system of FIG. 1. On the other hand, however, the switching system of FIG. 2 produces the aforesaid three problems. The present invention, which can overcome the above problems, will be explained below. In FIG. 2 CN denotes the aforesaid connector manufactured by special order.

Figure 3:
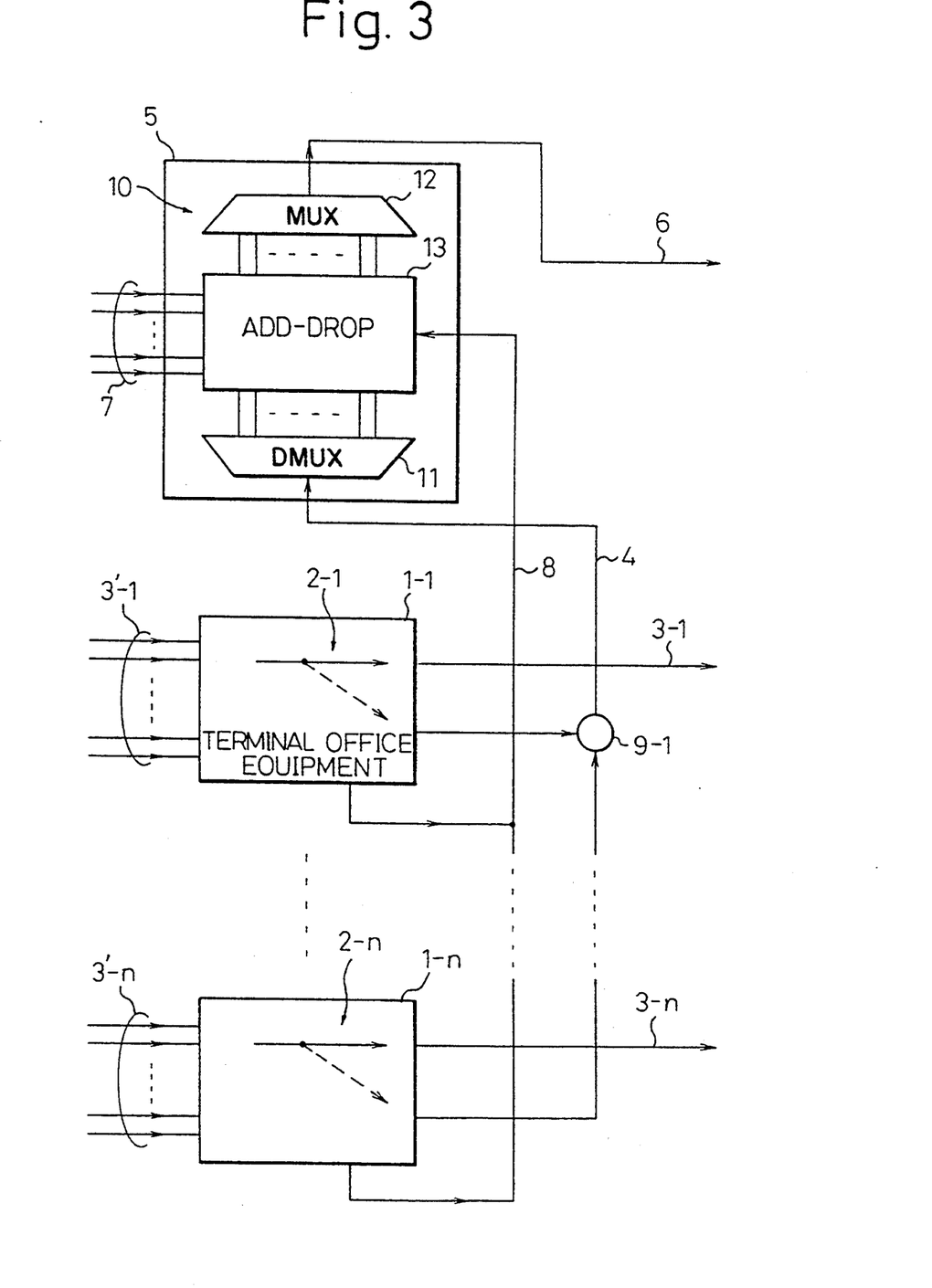
FIG. 3 is a view explaining the principle construction of a switching system according to the present invention.

FIG. 3 is a view explaining a principle construction of a switching system according to the present invention. As seen in FIG. 3, basically the switching system is operated with the plurality of working terminal office equipment 1—1 to 1—7 each having working transmission lines 3—1 to 3—n and 3'—1 to 3'—n and with protection equipment 5 that have both the protection transmission line 6 and the optional transmission lines 7. In the above construction, the switching system is comprised of the by-pass line 4 connected between the protection equipment 5 and a plurality of working terminal office equipment 1—1 to 1—n; the working switches 2—1 to 2—n, mounted in respective sets of the working terminal office equipment 1—1 to 1—n, for switching between each working transmission line 3—1 to 3—n and the by-pass line 4; a protection switch 10, mounted in the protection equipment 5, for connecting the optional transmission lines 7 with the protection transmission line 6 and connecting the protection line 6 with, via the by-pass line 4, one of the working transmission lines 3—1 to 3—n selectively.

The protection switch 10 includes therein a demultiplexer (first converting means) 11 and a multiplexer (second converting means) 12, each of which is operative to achieve a conversion between the signals at lower transmission rates and higher transmission rates, and these converting means 11 and 12 are connected to the by-pass line 4 and the protection transmission line 6, respectively. The protection switch 10 further includes therein an add-drop unit 13, located between the first and second converting means 11 and 12. The unit 13 is operative, at the stage of the lower order signals to perform a "through operation" to connect these converting means 11 and 12 with each other and, alternatively to perform an "add-drop operator" to connect the second converting means 12 with the optional transmission line 7 of a lower order signal.

It should be understood here that, in FIG. 3, one of the upstream transmission sides and the downstream transmission sides is taken for brevity. In FIG. 3, only a downstream side is taken as a representative, since the construction of the upstream side is quite similar to that of the downstream side. However, both the downstream and upstream side can be clarified with reference to FIG. 4 below.

Figure 4:
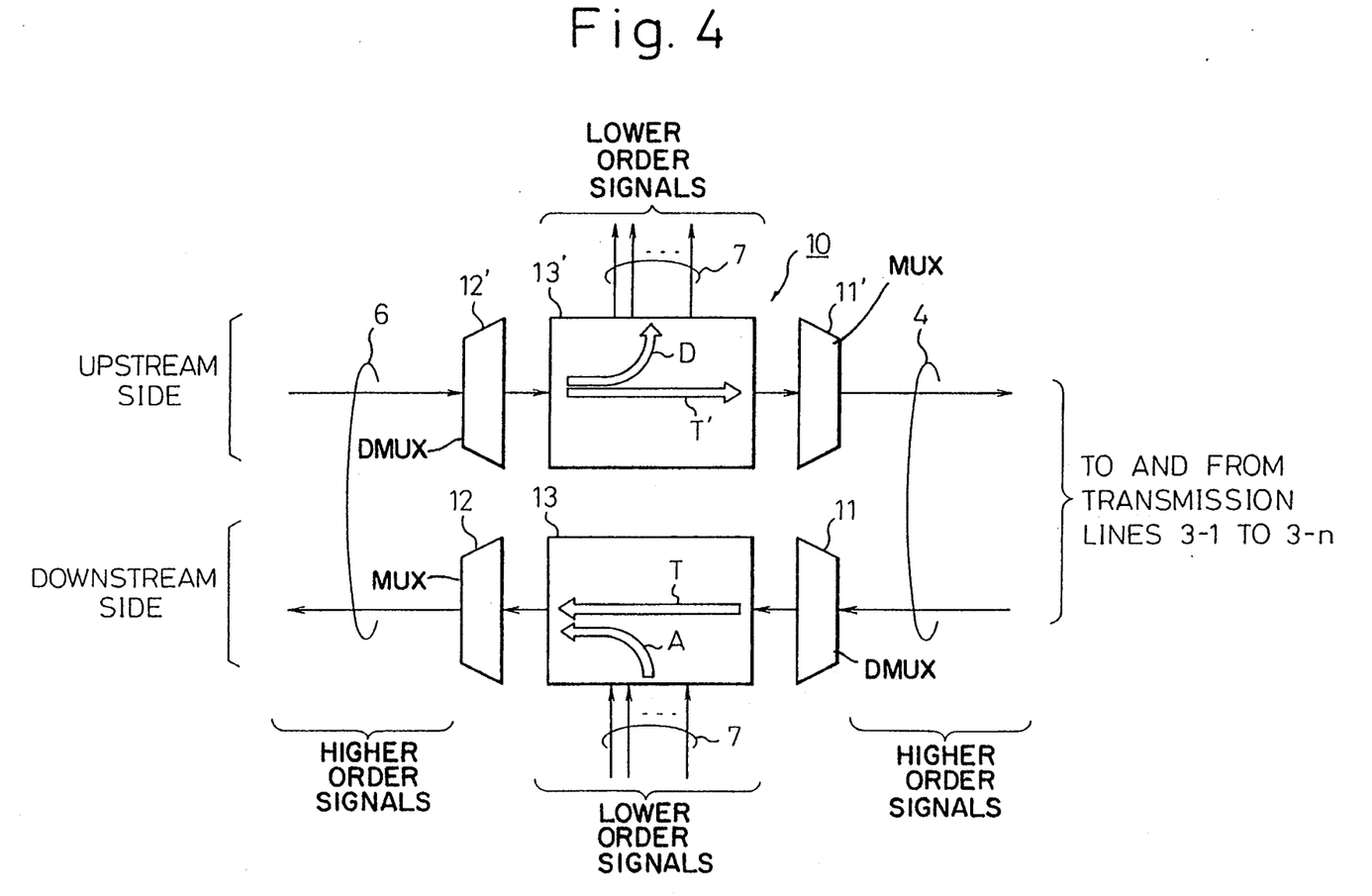
FIG. 4 is a view explaining a "through operation" and an "add-drop operation"

FIG. 4 is a view explaining a "through operation" and an "add-drop operation". In FIG. 4, the "through operation" can be schematically clarified by the arrows T and T'. The "through operation" becomes effective when one of the working transmission lines 3—1 to 3—n is switched over to the protection transmission line 6, i.e., during an abnormal state. While, the "add operation" and the "drop operation" can be schematically clarified by the arrows A and D, respectively. The "add-drop operation" becomes effective when the optional user information on the optional transmission line 6 is to be communicated, i.e., during a normal state.

As understood above, the protection switch 10 is operated for lower order signals. In other words, the protection switch 10, particularly the add-drop means 13 can operate at a low speed. This enables the aforesaid three problem to be overcome at the same time.

Figure 5:
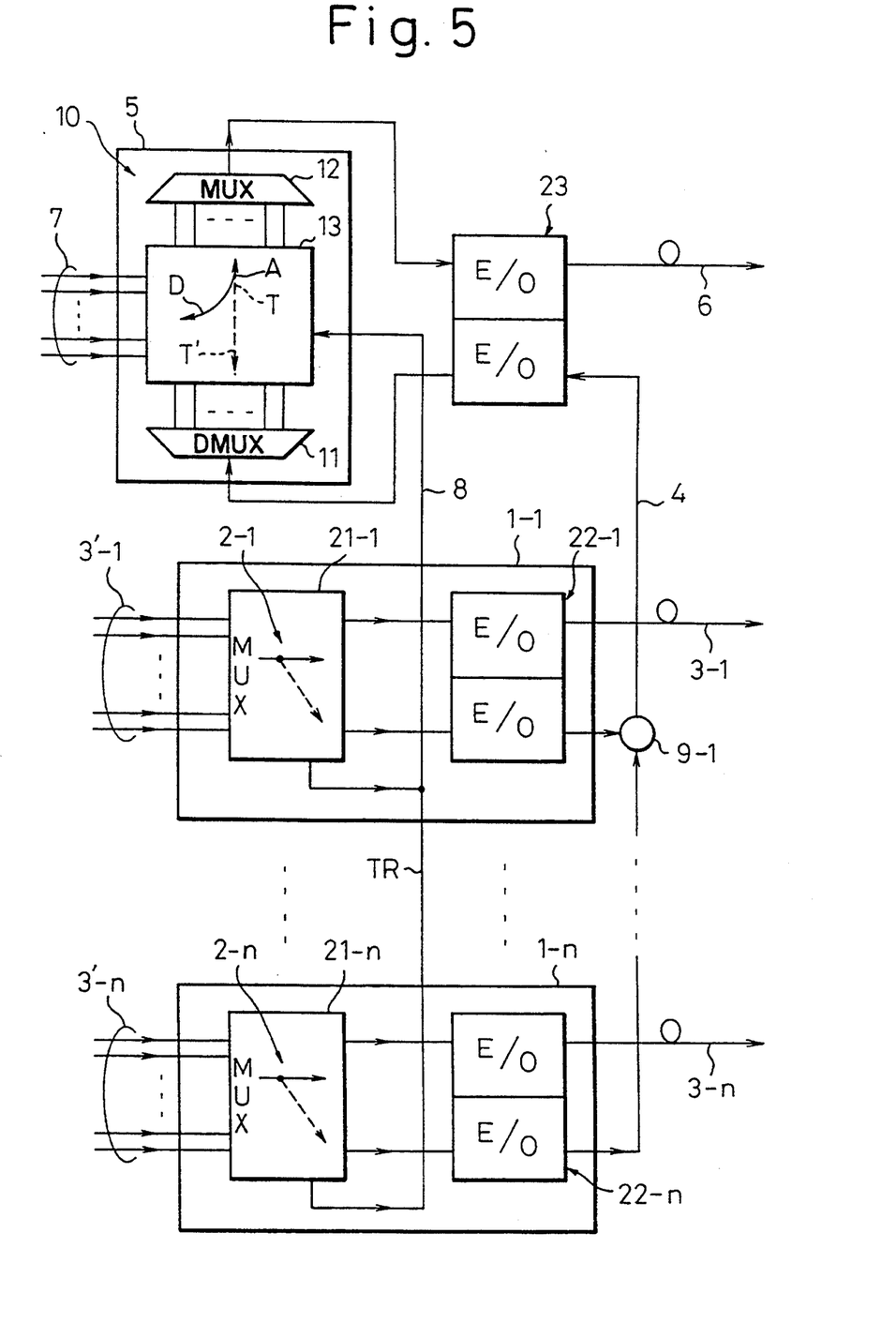
FIG. 5 is a more detailed view of FIG. 3.

FIG. 5 is a more detailed view of FIG. 3. In FIG. 5, the first converting means 11, the second converting means 12 and the add-drop means 13 are preferably set up unitarily as a known add-drop multiplexer, i.e., an ADM which will be explained hereinafter.

The add-drop multiplexer performs the through operation and the add-drop operation selectively under control by a conventional trigger signal generated when either one of the working office terminal equipment (1—1 to 1—n) should be switched over from its working transmission line (3—1 to 3—n) to the protection transmission line 6. The thus generated trigger signal TR is sent to the add-drop means 13 via a control line 8.

Each working terminal office equipment (1—1 to 1—n) is mainly constructed by a unit (21—1 to 21—n) and a unit (22—1 to 22—n). Each unit (21) includes both a multiplier (demultiplexer) and the working switch (2). The multiplexer (MUX) receives the optical signals of the lower signal transmission rate from the optical transmission line (3') to produce the multiplexed signal of a higher signal level transmission rate. The MUX is provided with, at its input, optoelectronic transducers (not shown) for each transmission line. The electric multiplexed signal is transferred to the working optical transmission line (3) or the optical by-pass line 4 through an optoelectronic (E/O) unit (22). Thus the units 22—1 to 22—n function as optical interface units.

Such optical interface units are also mounted for the protection transmission line 6, as shown by an optical interface unit 23 in FIG. 5. The unit 23 converts electric signals to optical signals, using the electric signals which are output from the protection switch 10.

In the protection switch 10, the first converting means 11 can consist of a known multiplexer-demultiplexer. The second converting means 12 can also consist of a known multiplexer-demultiplexer. Further, the add-drop means 13 can consist of a known time slot exchange circuit.

Figure 6A:
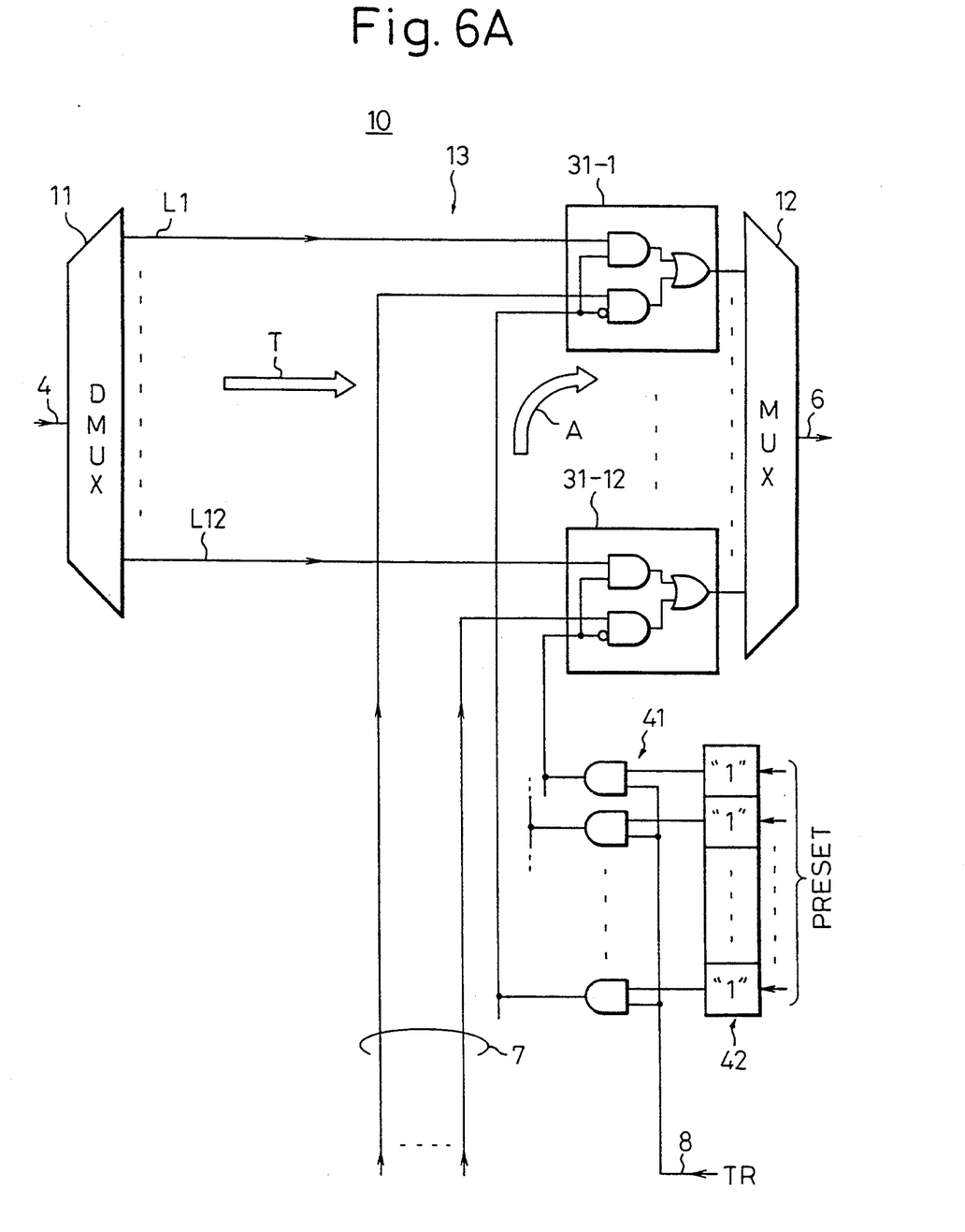
FIG. 6A and 6B illustrate a detailed construction of the add-drop means 13 and 13'.
Figure 6B:
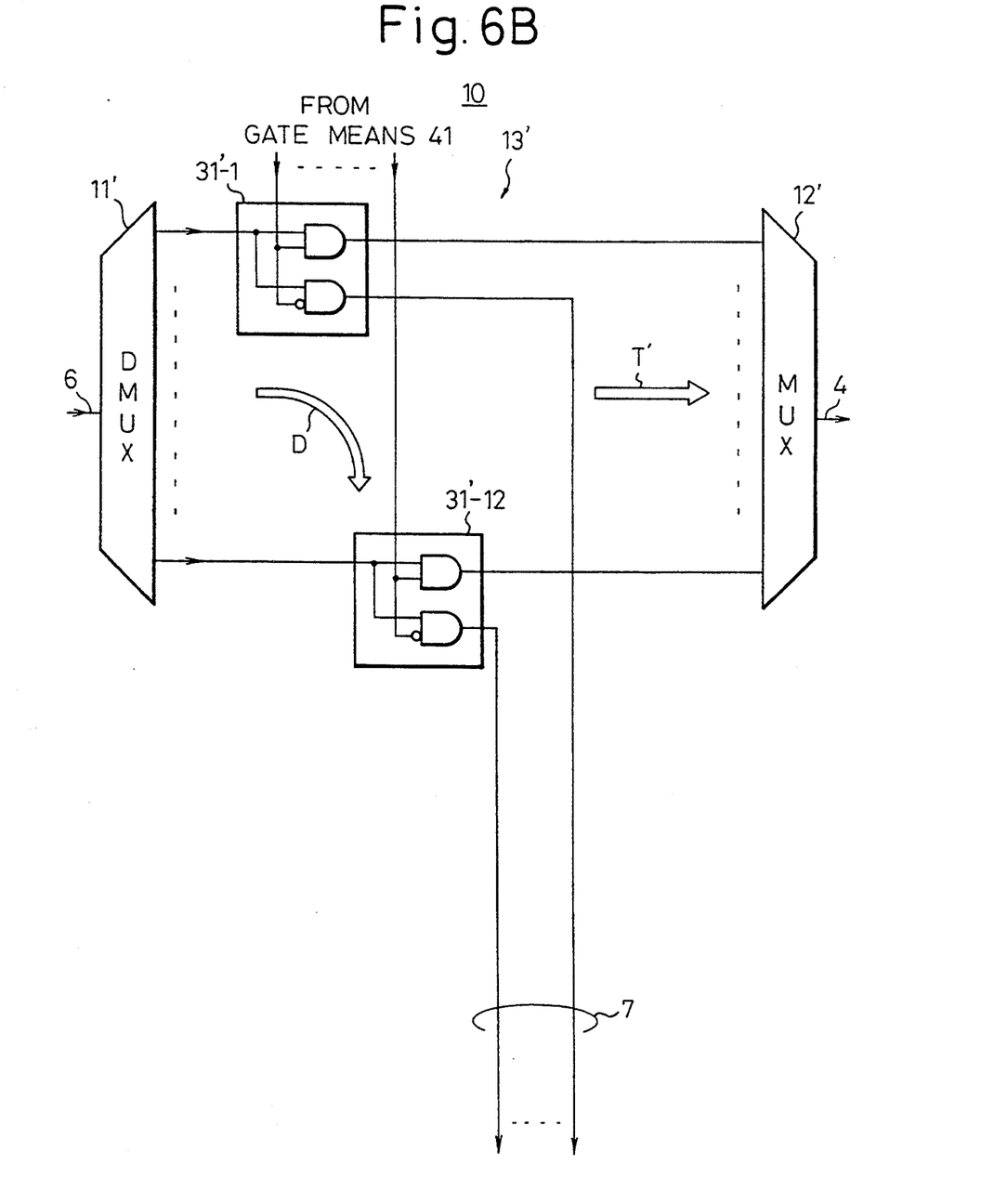

FIG. 6A and 6B illustrate a detailed construction of the add-drop means 13 and 13'. It should be understood that the construction of FIG. 6A and FIG. 6B correspond to the downstream side and the upstream side as in FIG. 4.

The means 13 of FIG. 6A operates as an add means that consists of, e.g., the aforesaid time slot exchange circuit to perform the "add operation" A or the "through operation" T. The means 13' of FIG. 6B operates as a drop means that consists of, e.g., the aforesaid time slot exchange circuit to perform the "drop operation" D or the "through operation" T'.

The time slot exchange circuit, i.e., the add-drop means, is comprised of logic gates 31—1 to 31—12 and 31'—1 to 31'—12. The numeral "12" corresponds to the number of lines L1 to L12 at a lower transmission rate. The number "12" also corresponds to the number of time slots.

During a normal state, the lower order signals from the optional transmission line 7 are applied to the second converting means 12, i.e., the multiplexer, through the logic gates (31) to form a first path (A). In this case, the bottom AND gates illustrated in each of the logic gates (31) opens, since the trigger signal (logic "1") TR is not sent from the control line 8.

During an abnormal state, the trigger signal ("1") TR is sent from the control line 8, and therefore, in each of the logic gate (31), the bottom AND gates is closed and the top AND gate is opened to form a second path (T). The output from the two AND gates are OR'd by each OR gate.

During the above abnormal state, the multiplexed signal from the by-pass line 4 is applied to the first converting means 11, i.e., the demultiplexer DMUX to produce the signals lower order signals for each of the lines L1 to L12.

In FIG. 6B, during a normal state, the signal of a higher signal level is given from the protection transmission line 6 and is applied to the first converting means 11', i.e., the demultiplexer DMUX. The demultiplexed lower order signals pass through the logic gates (31') to form a first path (D). In this case, the bottom AND gates in each of the logic gates (31') opens, since the trigger signal (logic "1") TR is not sent from the control line 8 (see FIG. 6A).

During an abnormal state, the trigger signal ("1") TR is sent from the control line 8 (see FIG. 6A), and therefore, in each of the logic gates (31'), the bottom AND gate is closed and the top AND gate is opened to form a second path (T').

During the above abnormal state, the demultiplexed signals from the logic gates (31') are applied to the second converting means 12', i.e., the multiplexer MUX to produce the higher order signal to be sent to the by-pass line 4.

Referring again to FIG. 6A, the trigger signal TR is applied commonly to the logic gates 31—1 to 31—12 (also 31'—1 to 31'—12 in FIG. 6B) by way of gate means 41 comprised of, e.g., AND gates, as illustrated. The gate means 41 further cooperates with setting means 42 comprised of a register as illustrated.

The gate means 41 and the setting means 42 are inherently incorporated into the aforesaid add-drop multiplexer (ADM) together with the logic gates (31, 31'). Therefore, if the add-drop means 13 and 13' are fabricated without utilizing the ADM that is commercially available, both means 41 and 42 can be omitted, where the trigger signal TR is commonly and directly applied to the logic gates (31, 31').

Contrary to the above, if the add-drop means 13 and 13' are realized by utilizing the ADM as conventionally available, the setting means 42, i.e., the register, must be preset with a predetermined logic ("1", "0") so as to attain an intended function dedicated to the add-drop means 13 particularly suitable for the protection switch 10. Namely, the register (42) must be preset with logic "1", where all the AND gates (41) are ready to pass therethrough the trigger signal TR if it is sent from the control line 8. The difference between the known ADM and the ADM dedicated to the protection switch 10 is that the demultiplexed signal in the switch 10 are not handled channel by channel, as in the known ADM. Therefore, all the AND gates (41) are required to be opened or closed at one time.

Figure 7:
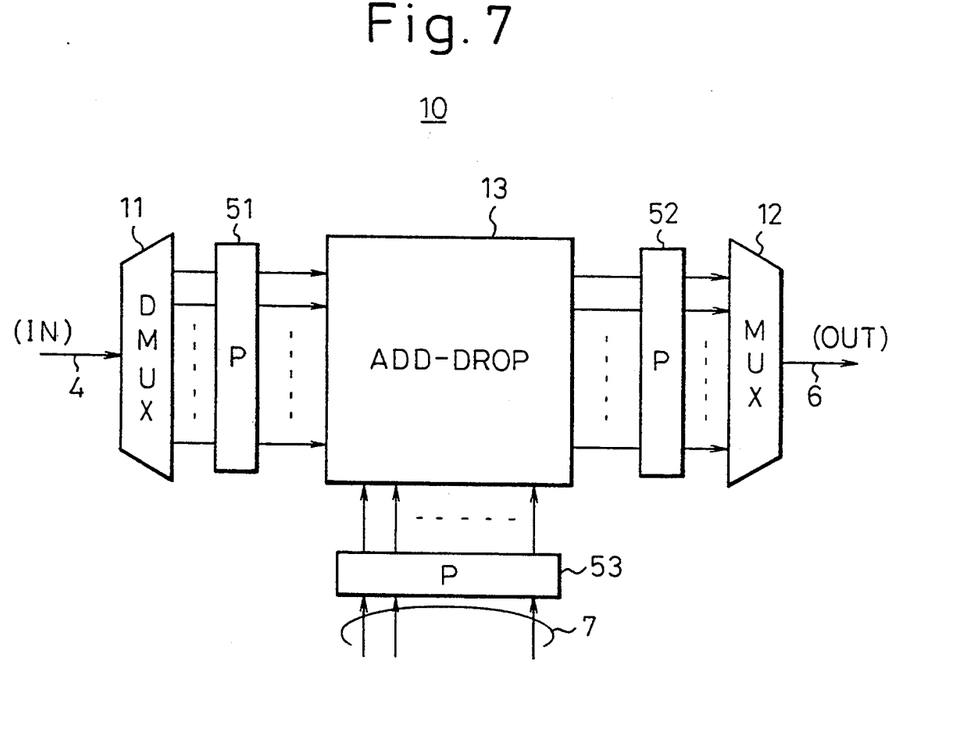
FIG. 7 is a view of a pointer generation units.

The known ADM is available for, e.g., the North American SONET communication network. In this sense, the protection switch 10 of the present invention can be realized merely by introducing the known ADM therein, FIG. 7 is a view of pointer means in a SONET system. Under the SONET communication network, the pointer means is essential to maintain synchronization between the incoming frame signals and the outgoing frame signals. In the protection switch 10, it is preferable to introduce the pointer means (P) as shown by reference numerals 51, 52 and 53.

Figure 8:
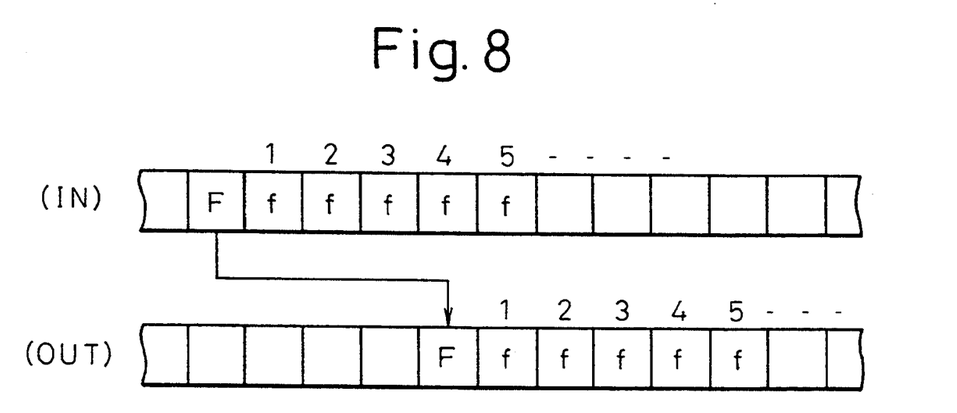
FIG. 8 is a timing chart explaining the pointer generation unit.

The function of the pointer means is known but briefly expressed in FIG. 8.

FIG. 8 is a timing chart for explaining the pointer means. In FIG. 8, the upper row represents a multiframe format of the incoming signal and the lower row represents a multiframe format of the outgoing signal. The incoming and the outgoing signals are the same frequency, e.g. 152 MHz, however, the phase of each frame of the incoming signal is not the same as the phase of each corresponding frame of the outgoing signal due to the delay time given through the ADM. F represents a frame synchronization flag. In order to match the difference in phase therebetween, pointing numerals such as 1, 2, 3, 4 . . . are allotted to the incoming signal. Then the outgoing signal is rearranged in the order of the thus allotted pointing numerals. Usually, the difference in phase between the incoming side flag F and the outgoing side flag F does not vary but is fixed. Even so, the length of each frame is different, thereby explaining why the pointing numerals are required for each frame f. In the known ADM, the above allocation of the pointing numerals is carried out by a pointer means.

Thus, in FIG. 7, similar pointer means can also be incorporated in the protection switch 10 such as shown by the pointer means 51, 52 and 53. In FIG. 7, the pointer means 51 and 53 are operative to allot the pointing numerals, and the pointer means 53 rearranges each frame in the order of the pointing numerals. Thus, there is a synchronization between the incoming signal and the outgoing signal. In a synchronous transfer mode network such as SONET, the pointer means is necessary therefor. Incidentally, in an asynchronous transfer mode (ATM) network, similar synchronization can be attained using a known frame memory instead of the pointer means. However, the frame memory induces a large delay time between the incoming signal and the outgoing signal.

As mentioned previously, the protection switch 10 can easily be realized by using the existing ADM. However, the use of the ADM in the protection switch 10 is unique and new, since the ADM is used for use in the working transmission line, particularly in the optical working transmission line as shown in FIG. 9.

Figure 9:
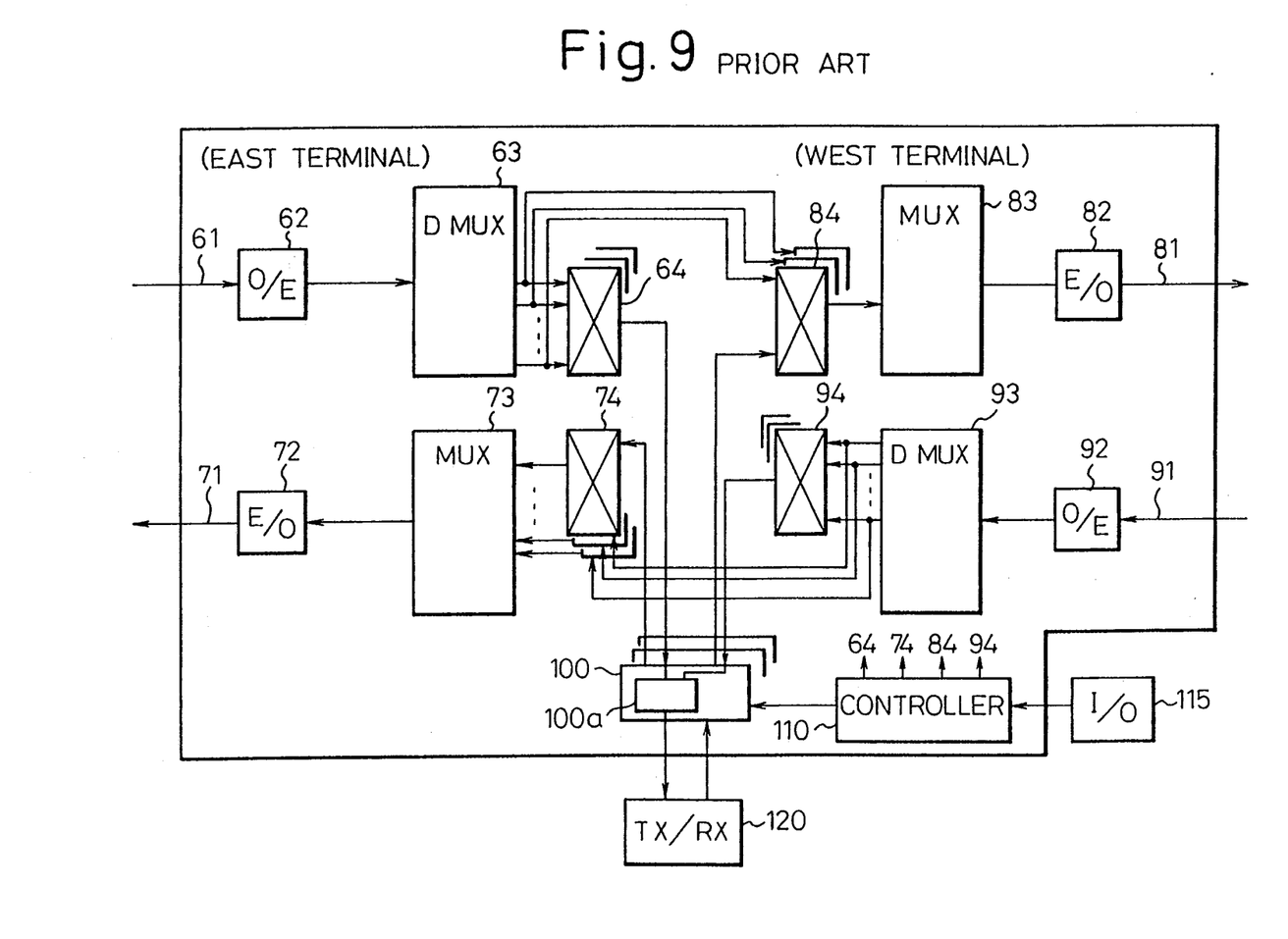
FIG. 9 is a block diagram of an example of a prior art optical transmission network in which the ADM is used.

FIG. 9 is a block diagram of an example of a prior art optical transmission network in which an ADM is used. As seen from FIG. 9, the ADM's are conventionally used as shown by reference numerals 63, 64, 73, 74, 83, 84, 94 and 94 in the upstream and downstream working transmission lines 61, 71, 81 and 91. A multiplexed optical signal of higher signal transmission rate transmitted from an optical transmission line 61 connected to an East terminal is converted into an electric signal by an optoelectronic (O/E) transducer 62. The electric signal is then separated by the demultiplexer (DMUX) 63 into a plurality of channels, which are then transmitted to drop switches 64 and add switches 84. There are as many drop switches 64 and as many add switches 84 as the number of channels. Each of the drop switches 64 is connected to all of the channels, and each add switch 84 is connected to one of the channels, thus establishing a through channel. The drop switches 64 select, as a drop channel, one of the channels separated by the demultiplexer 63 in response to a selection signal from a controller 110, and transmit the signal through the selected channel to channel switches 100 for lower signals. There are as many channel switches 100 as the number of channels, and the signals from the drop switches 64 are transmitted to these channel switches 100. A drop channel to be selected has previously been indicated to the controller 110 by keystrokes entered through an input/output device 115. The selection signal applied to the drop switches 64 represents the drop channel thus selected.

The channel switches 100 select either the output signal from the drop switches 64 (i.e., the signal received from the East terminal), or an output signal from drop switches 94 (described below—i.e., a signal received from a West terminal), and transmit the selected signal to transmitter/received 120 for lower order signals. The above selection made by the channel switches 100 is based on a selection signal that is produced by the controller 110 according to keystrokes entered through the input/output device 115, and which is applied to path switches 100a in the respective channel switches 100.

Similarly, a multiplexed optical signal of higher transmission rate transmitted from an optical transmission line 141 connected to the West terminal is converted into an electric signal by an optoelectronic (O/E) transducer 92. The electric signal is then separated by the demultiplexer (DMUX) 93 into a plurality of channels, which are then transmitted to drop switches 94 and the add switches 74. There are as many drop switches 94 and as many add switches 74 as the number of channels. Each of the drop switches 94 is connected to all the channels, and each add switch 74 is connected to one of the channels. The drop switches 94 select, as a drop channel, one of the channels separated by the demultiplexer 93 in response to a selection signal from a controller 110, and transmit the signal through the selected channel to the channel switches 100 for lower order signals. As described above, there are as many channel switches 100 as the number of channels, and the signals from the drop switches 144 are transmitted to these channel switches 100.

A signal transmitted from the transmitter/receiver (TX/RX) 120 is sent through gates (not shown) in the channel switches 100 to the add switches 74 and the add switches 84. The channel switches 100, which are as many as the channels, are connected to the add switches 74, 84, so that all signals from the channels switches 100 are sent to any one of the add switches 74, 84.

In response to a selection signal from the controller 110, the add switches 74 connected to the East terminal select one of the signals in the channels and the one-channel signal from the demultiplexer 93, thus establishing an add channel, and outputs the selected signal to a multiplexer 73. The add switches 74 select the signal based on a selection signal transmitted from the controller 110 representing a channel to be selected, as indicated by the input/output device 115.

Inasmuch as there are as many add switches 74 as the number of channels, the multiplexer 73 is supplied with signals transmitted from the add switches 74 in the respective channels. The multiplexer 73 multiplexes the supplied signals into an electric signal, which is then applied to an electro-optic (E/O) transducer 72. The electric signal is then converted by the electro-optic transducer 72 into an optical signal that is outputted to an optical transmission line 7.

Likewise, responsive to a selection signal from the controller 110, the add switches 84 connected to the West terminal select one of the signals in the channels and the one-channel signal from the demultiplexer 63, and output the selected signal to a multiplexer 83. The multiplexer 83 multiplexes the signals supplied from the add switches 84 in the respective channels into an electric signal, which is then applied to an electro-optic (E/O) transducer 82. The electric signal is then converted by the electro-optic transducer 82 into an optical signal that is output to an optical transmission line 81.

In the linear ADM, the drop switches connected to the East terminal, the drop switches connected to the West terminal, the add switches connected to the East terminal, the add switches connected to the West terminal, and the channel switches for lower order signals operate to change channels based on established paths. Therefore, the transmitter/receivers for lower order signals can be connected to any device As explained above in detail, according to the switching system of the present invention, the protection equipment can be realized by a simple construction because of the employment of the add-drop means, which is allowed to operate at low speed.

What is claimed is:

1. A switching system including a protection switch for switching over one of a plurality of working transmission lines to a protection transmission line and switching over an optional transmission line to the protection transmission line, selectively, said protection switch comprising:

first converting means and second converting means for converting between signals at a lower rate and a higher rate, and operatively connected to said working transmission lines and said protection transmission line, respectively; and add-drop means, operatively connected between said first and second converting means, for performing, at the lower rate, a through operation to connect said first and second converting means with each other and, alternatively performing an add-drop operation to connect said second converting means with the optional transmission line.

2. A switching system as set forth in claim 1, wherein said first converting means, said second converting means and said add-drop means are provided unitarily by an add-drop mulitplexer.

3. A switching system as set forth in claim 2, further comprising means for generating a trigger signal to request switching of one of the working transmission lines to the protection transmission line, and wherein said add-drop multiplexer performs the through operation and the add-drop operation selectively under control by the trigger signal.

4. A switching system as set forth in claim 1, further comprising means for generating a trigger signal to request switching of one of the working transmission lines to the protection transmission line, and wherein said add-drop means is comprised of logic gates that form a first path and a second path selectively under control by the trigger signal.

5. A switching system as set forth in claim 1, wherein said protection switch further comprises pointer generation means identifying frame positions of incoming signals and outgoing signals to be passed through said add-drop means.

6. A switching system as set forth in claim 5, wherein said pointer generation means is constructed to handle SONET signals.

7. A switching system as set forth in claim 1, wherein said first and second converting means are comprised of a multiplexer and a demultiplexer, respectively, both operatively connected to said add-drop means and respectively operatively connected to the working transmission line and the protection line.

8. A switching system as set forth in claim 1, wherein said add-drop means is comprised of a time slot exchange circuit operatively connected to said first and second converting means and the optional transmission line.

9. A switching system operated with a plurality of working terminal office equipment, each having a working transmission line, and protection equipment having both a protection transmission line and an optional transmission line, said switching system comprising:

a by-pass line connected between the protection equipment and the plurality of working terminal office equipment;

working switches, mounted in respective working terminal office equipment for switching between said working transmission line of the respective working terminal office equipment and said by-pass line;

a protection switch, mounted in said protection equipment, for connecting the optional transmission line with the protection transmission line and connecting said protection line, via said by-pass line, with the working transmission line connected to one of the working terminal office equipment, selectively, said protection switch including:

first converting means and second converting means for converting between signals at a lower rate and a higher rate, and operatively connected to said by-pass line and the protection transmission line, respectively; and add-drop means, located between said first and second converting means, for performing, at the lower rate a through operation to connect said first and second converting means with each other and, alternatively performing an add-drop operation to connect said second converting means with the optional transmission line.

10. A switching system as set forth in claim 9, wherein said first converting means, said second converting means and said add-drop means are provided unitarily by an add-drop multiplexer.

11. A switching system as set forth in claim 10, wherein the working transmission line of each of the working terminal equipment, the protection transmission line and said by-pass line are all optical transmission lines through which multiplexed optical signals are transmitted at the higher rate, and wherein said switching system further comprises photocouplers, inserted in said by-pass line, to selectively transfer signals from the working transmission line of one of the working terminal office equipment to said bypass line.

* * * * *

UNITED STATES PATENT AND TRADEMARK OFFICE
CERTIFICATE OF CORRECTION

PATENT NO. : 5,343,464　　　　　　　　　　　　　　Page 1 of 2
DATED : August 30, 1994
INVENTOR(S) : IINO, et al.

It is certified that error appears in the above-indentified patent and that said Letters Patent is hereby corrected as shown below:

Col. 1,　　line 42, "optional" s/b --optical (optional)--.

Col. 2,　　line 55, "units" s/b --unit--.

Col. 3,　　line 2, "Fig. 4" s/b --Fig. 1--;

line 5, delete "level";

line 6, after "3'-n)" insert --for--.

Col. 4,　　line 9, "1-7" s/b --1-n-- .

Col. 5,　　line 19, delete "level".

Col. 6,　　line 4, delete "signals" (first occurrence).

Col. 7,　　line 39, delete "use in";

line 46, "94" (first occurrence) s/b --93--;

UNITED STATES PATENT AND TRADEMARK OFFICE
CERTIFICATE OF CORRECTION

PATENT NO. : 5,343,464
DATED : August 30, 1994
INVENTOR(S) : Iino, et al.

It is certified that error appears in the above-indentified patent and that said Letters Patent is hereby corrected as shown below:

Col. 7, line 63, after "lower" insert --order--.

Signed and Sealed this

Thirteenth Day of December, 1994

Attest:

BRUCE LEHMAN

*Attesting Officer*   *Commissioner of Patents and Trademarks*